(12) United States Patent
Wu et al.

(10) Patent No.: US 7,231,384 B2
(45) Date of Patent: Jun. 12, 2007

(54) NAVIGATION TOOL FOR EXPLORING A KNOWLEDGE BASE

(75) Inventors: Yuh-Cherng Wu, San Jose, CA (US); Huiling Gong, Sunnyvale, CA (US)

(73) Assignee: SAP Aktiengesellschaft, Walldorf (DE)

( * ) Notice: Subject to any disclaimer, the term of this patent is extended or adjusted under 35 U.S.C. 154(b) by 298 days.

(21) Appl. No.: 10/328,257

(22) Filed: Dec. 23, 2002

(65) Prior Publication Data
US 2004/0083206 A1    Apr. 29, 2004

Related U.S. Application Data

(60) Provisional application No. 60/421,650, filed on Oct. 25, 2002.

(51) Int. Cl.
*G06F 17/30* (2006.01)
(52) U.S. Cl. .................................. 707/3; 707/4; 707/6
(58) Field of Classification Search ................. 707/3, 707/4, 6
See application file for complete search history.

(56) References Cited

U.S. PATENT DOCUMENTS

| | | | |
|---|---|---|---|
| 5,809,499 A | | 9/1998 | Wong et al. |
| 5,940,821 A * | | 8/1999 | Wical .............................. 707/3 |
| 6,085,187 A | | 7/2000 | Carter et al. |
| 6,236,987 B1 * | | 5/2001 | Horowitz et al. ............... 707/3 |
| 6,240,410 B1 * | | 5/2001 | Wical .............................. 707/4 |
| 6,442,566 B1 * | | 8/2002 | Atman et al. ........... 707/103 R |
| 6,523,021 B1 * | | 2/2003 | Monberg et al. ................ 707/2 |
| 6,665,681 B1 * | | 12/2003 | Vogel .......................... 707/101 |
| 6,704,729 B1 * | | 3/2004 | Klein et al. ..................... 707/5 |
| 6,711,585 B1 * | | 3/2004 | Copperman et al. ...... 707/104.1 |
| 6,839,699 B2 * | | 1/2005 | Chan ........................... 706/45 |
| 6,850,944 B1 * | | 2/2005 | MacCall et al. ............ 707/100 |
| 6,928,432 B2 * | | 8/2005 | Fagan et al. .................... 707/3 |
| 7,096,218 B2 * | | 8/2006 | Schirmer et al. ............... 707/5 |
| 7,120,629 B1 * | | 10/2006 | Seibel et al. .................... 707/5 |
| 2001/0049677 A1 * | | 12/2001 | Talib et al. ..................... 707/3 |
| 2002/0161736 A1 | | 10/2002 | Beygelzimer et al. |
| 2003/0217335 A1 * | | 11/2003 | Chung et al. ................ 715/514 |

OTHER PUBLICATIONS

Karypis et al., "Multilevel Hypergraph Partitioning: Applications in VLSI Domain," 34th Design Automation Conference (1997), 4 pages.
Agrawal et al., "Fast Algorithms for Mining Association Rules," Proceedings of the 20th International Conference of Very Large Data Bases, VLDB (1994), pp. 1-32.
Internet site, http://www.inxight.com; Inxight Software, Inc. Site Map, 1 page, Dec. 9, 2002.
Clifton, C. et al, "TopCat: Data Mining Topic Identification in a Text Corpus," Mar. 15, 2000, pp. 1-33, XP002296783.

(Continued)

*Primary Examiner*—Don Wong
*Assistant Examiner*—Thanh-Ha Dang
(74) *Attorney, Agent, or Firm*—Fish & Richardson P.C.

(57) ABSTRACT

The disclosure relates to a system that allows a user to enter a search query, to explore a knowledge base through a hierarchical model of concepts each of which is mentioned in one or more documents stored in the knowledge base, and to refine the search query based on a displayed portion of the hierarchical model.

73 Claims, 6 Drawing Sheets

OTHER PUBLICATIONS

Cooper, J. W. et al, "Lexical Navigation: Visually Prompted Query Expansion and Refinement," 1997, pp. 237-246, XP002265696.

Lin, S-H. et al, "Extracting Classification Knowledge of Internet Documents with Mining Term Associations: A Semantic Approach," Proceedings of the 21st Annual International ACM-SIGIR Conference on Research and Development in Information Retrieval, Melbourne, Aug. 1998, pp. 241-249, XP000825364.

Munroe, K. D. et al, "BBQ: A Visual Interface for Integrated Browsing and Querying of XML," Proceedings of the IFIP Working Conference on Visual Database Systems, May 2000, 15 pages, XP002167785.

Staab, S. et al, "Semantic Community Web Portals," Computer Networks, vol. 33, No. 1-6, Jun. 2000, pp. 473-491, XP004304786.

* cited by examiner

NAVIGATION TOOL FOR EXPLORING A KNOWLEDGE BASE

RELATED APPLICATIONS

This application claims the benefit of priority of U.S. Provisional Patent Application No. 60/421,650, filed on Oct. 25, 2002.

TECHNICAL FIELD

This disclosure relates to a navigation tool for exploring a knowledge base.

BACKGROUND

The increased capability of computers to store vast collections of information has led to a need for increasingly efficient techniques for information retrieval. Information retrieval refers to searching for relevant information in information systems that may contain numerous documents. Some information retrieval systems are based on keywords that index documents and a query language to retrieve documents from centralized document repositories according to those keywords. Typically, a text search engine that executes a query formulated by a user and returns a set of documents matching the keywords identified within the query is utilized. Some search engines may even predict what information is relevant to a user based on keywords identified in such a query. Such techniques, however, are insufficient to meet the diversified information retrieval needs of some users. In addition, traditional information retrieval systems may not identify the vast amount of potentially relevant documents that may best answer a particular user's need.

Various limitations may be associated with some information retrieval systems. For example, in some information retrieval systems, there is no genuine interaction between user and system. The user merely accesses information in a passive fashion and a priori needs to know how to query relevant information with keywords. The effect of this is that users, both skilled and unskilled in information retrieval, must know how to characterize the information they are searching for with appropriate keywords before an actual search commences. The formulation of such a query can be a difficult task, especially in light of the vast amount of information available on the Internet.

SUMMARY

The disclosure relates to a system that allows a user to enter a search query, to explore a knowledge base using a hierarchical model of concepts mentioned in documents stored in the knowledge base, and to refine the search query based on the hierarchical model.

In one aspect, a method includes responding to a search query by displaying one or more concepts from a hierarchical model of concepts, each of which is mentioned in at least one document stored in a knowledge base. The displayed concept(s) match the search query and are displayed on a first section of a display. Concepts from the hierarchical model that are associated with the concept(s) displayed in the first section are displayed in another area of the display.

In one implementation, the concept(s) that match the search query may be displayed in a center area, and the associated concepts may be displayed at distal ends of spokes connected to the center area.

By displaying concepts, for example, that are closely associated with those concepts that match the search query, a user can more easily navigate the hierarchical vertically or horizontally to help the user determine whether, and how, to refine the search query.

A system to implement the foregoing method also is disclosed. The system may facilitate the user's ability to identify other concepts that may be relevant to the user's query and may provide a simple way of refining the search query based on the hierarchical model. For example, using the displayed portion of the hierarchical model of concepts, the user can add or remove concepts, merge previous views of the model and rotate the model in order to view additional concepts that may be associated with the concepts that match the search query. The system may provide a definition or brief summary of displayed concepts as well as an indication of the strength of association between the concepts that match the search query and the displayed associated concepts.

Various implementations may facilitate a user's searching, navigation and exploration of a knowledge base and allow the user to drill down to finer levels of the concept model. The system may provide a convenient and easy technique for refining a search so that the user can obtain a list of documents or links to documents that are likely the most relevant to the user's query. Furthermore, by generating a hierarchical concept model based on concepts that actually are mentioned in the documents and by using information regarding the strengths of links among concepts, the system's response to a search query may be improved.

The system may be particularly advantageous in the context of customer relationships management, for example, to assist a call center agent in answering a customer question. However, the system and techniques described here may be used in other contexts as well.

Although the hierarchical model of concepts may be generated in any number of ways, one technique includes identifying concepts that are mentioned in documents stored in a knowledge base and generating a matrix to reflect co-occurrence frequencies of concepts appearing in the documents. The technique includes generating association rules based on the co-occurrence frequencies, where the association rules are indicative of frequencies with which specified groups of concepts appear in the same document. The association rules are converted to an undirected hypergraph, which is partitioned into clusters of concepts, where each cluster is represented by one or more characteristic concepts in that cluster. The technique also includes taking snapshots of the hypergraph during the partitioning, and storing a three-dimensional hierarchical model of the concepts based on the snapshots.

Other features and advantages will be readily apparent from the following detailed description, the accompanying drawings and the claims.

DETAILED DESCRIPTION

Figure 1:
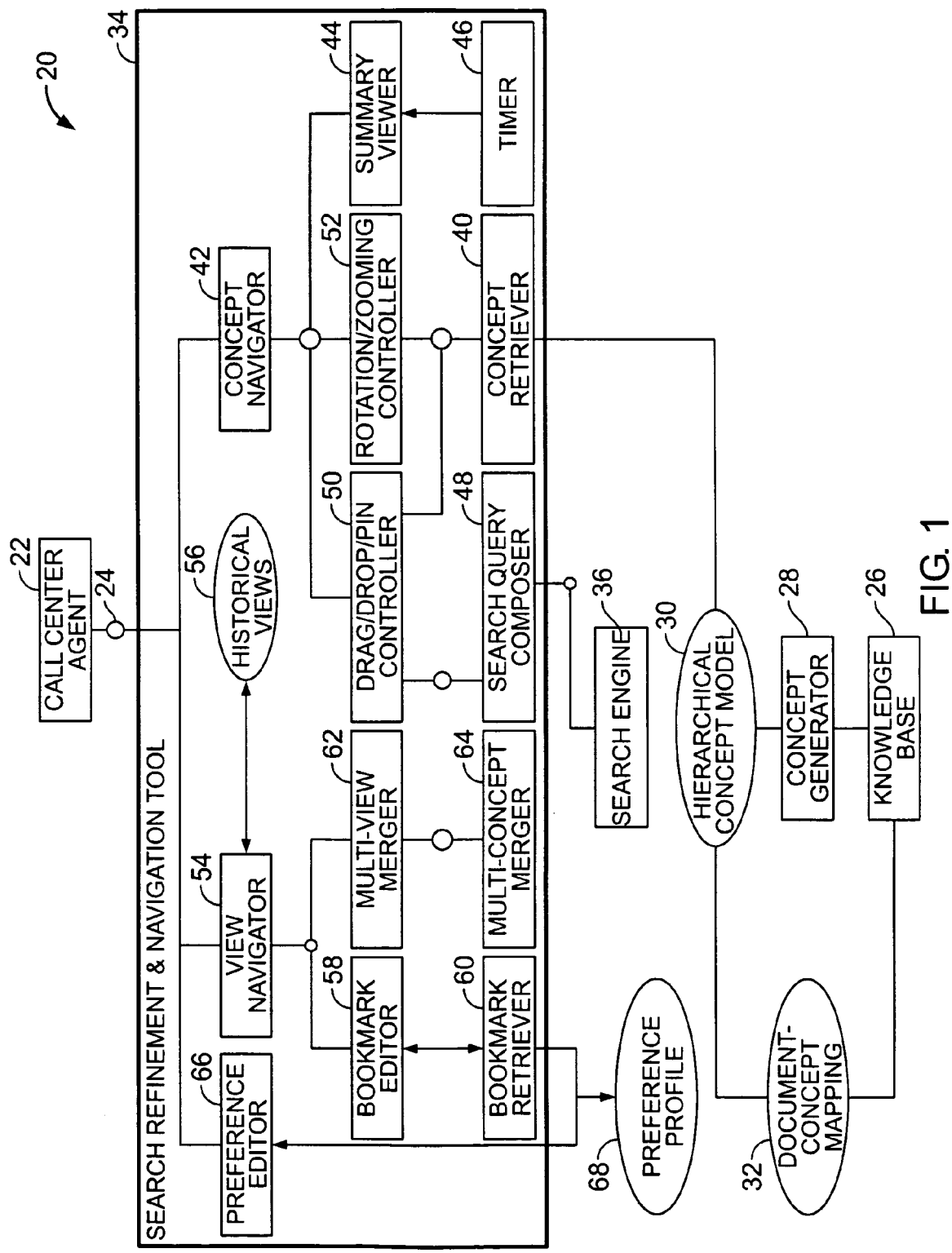
FIG. 1 illustrates a block diagram of a computer-based system for searching and exploring a knowledge base.

FIG. 1 illustrates a computer-based system 20 that allows a user, such as a call center agent 22, to enter a search query through a user interface 24 and explore a knowledge base. The system may provide the user with a graphical view of concepts that may be relevant to the user's query and allows the user to navigate a hierarchical three-dimensional model 30 of the concepts associated with documents stored in the knowledge base. The user can refine the search easily using the hierarchical concept model. The system also may provide the user with a list of documents in which specified concepts appear.

As shown in FIG. 1, the system includes a knowledge base 26 that serves as a repository for information. Although only a single knowledge base 26 is illustrated in FIG. 1, the system may be configured to support multiple knowledge bases. The knowledge base 26 may include a collection of documents, such as electronic mail (e-mail) messages, web pages, business documents, etc., that may be searched and organized for users.

Figure 2:
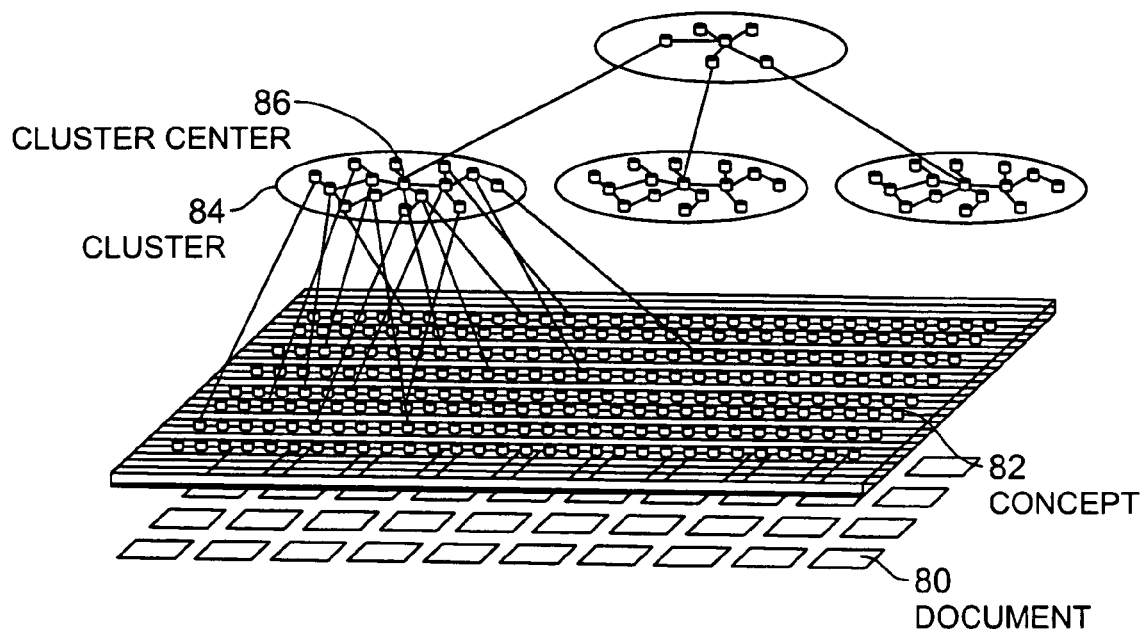
FIG. 2 illustrates part of a hierarchical model of concepts appearing in documents stored in the knowledge base.

As shown in FIG. 2, each document 80 in the knowledge base may be represented as a vector whose components correspond to concepts 82 that appear in the document. Concepts also may be referred to as features. Documents may be clustered into groups of documents similar in content. For example, the documents may be clustered into groups of feature vectors reflecting some minimum level of similarity. In some implementations, hierarchical clustering algorithms based on star clustering are used. The star clustering algorithm may reveal the topic-subtopic structure of the knowledge base 26.

In the present context, a concept may refer, for example, to a term or phrase, such as a noun phrase, appearing in one or more of the documents 80. A concept also may represent a cluster 84 of concepts, which may be represented by a center concept 86 surrounded by its child concepts. The content of the center concept 86 may be a combination of some or all of its child concepts. Additionally, a topic defined, for example, by a knowledge engineer or other system administrator may be considered a concept.

As illustrated in FIG. 2, the concepts are clustered hierarchically in a binary tree structure with a root at the top. Although FIG. 2 shows only two levels of clusters 84, the hierarchical model typically may include many more clusters and cluster levels.

Figure 3:
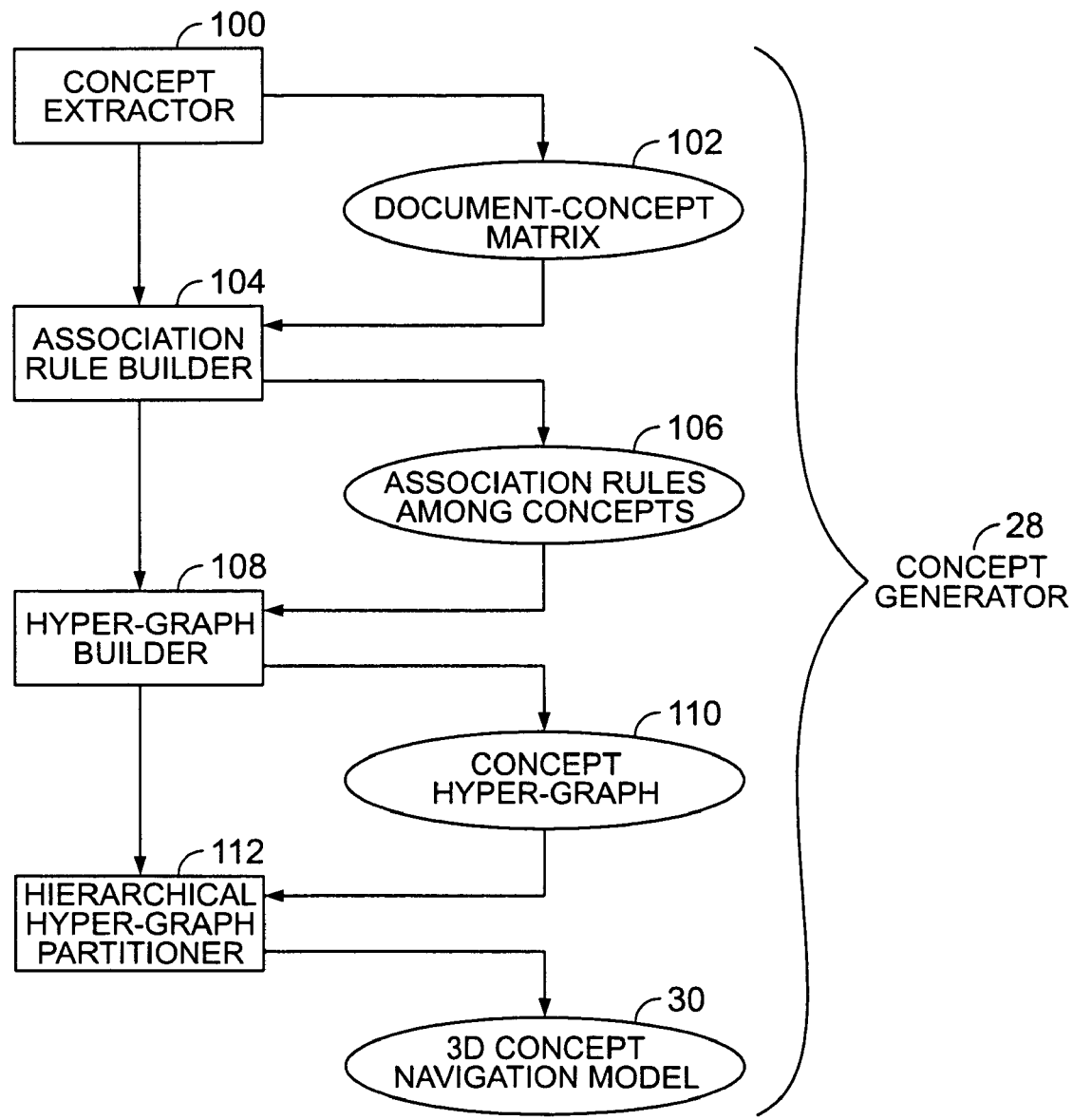
FIG. 3 illustrates a functional block diagram for generating the hierarchical concept model.

A concept generator 28 (FIG. 1) manages the transformation of textual based information in the knowledge base 26 into the hierarchical concept model 30. One implementation of the concept generator 28 is illustrated in FIG. 3. A concept extractor component 100 of the concept generator 28 extracts concepts from each document using, for example, a natural-language processing tool. The concept extractor also determines statistical information reflecting the frequency of occurrence of each concept in each document. A two-dimensional matrix 102 may be generated to reflect the co-occurrence frequencies of the concepts appearing in the documents.

An association rule builder 104 in the concept generator calculates association rules 106 for the concepts based on the co-occurrence of the concepts in the document set and conditional probabilities among the concepts. The association rules, which can be considered probabilistic rules, describe the correlation of concepts, in other words, how frequently various concepts occur together. In one implementation, the Apriori algorithm may be used. Further details of that algorithm may be found, for example, in Agrawal et al., "Fast Algorithms for Mining Association Rules," Proceedings of the 20th International Conference of Very Large Data Bases, VLDB (1994).

To improve performance, only essential association rules need be learned, where essential rules are association rules with only one element on the right side of the rule. For example, the rule AB->C would be an essential association rule, whereas the association rule A->BC would not be an essential association rule.

A hypergraph builder 108 converts the association rules 106 into an undirected hypergraph 110 by taking the average of the confidence values of the essential association rules within a large item set. The weight of each hyper-edge in the hypergraph may be determined using either arithmetic or geometric averaging techniques.

Next, a hierarchical hypergraph partitioning component 112 clusters the undirected hypergraph 110, with each cluster representing a sub-graph of the original hypergraph. The partitioning component 112 further clusters each cluster until some predetermined criteria is met. The predetermined criteria may be configurable. Examples of the predetermined criteria include continuing the partitioning until the number of concepts inside each cluster is less than a preset value or until the edge weight of each uncut edge of the hypergraph is above a preset threshold value.

For example, the partitioning component 112 initially may partition the original hypergraph into two clusters. Next, the cluster with the greater number of concepts is partitioned into another two clusters. Then, the cluster with the greatest number of concepts among the three clusters is partitioned into another two clusters. This process continues until the predetermined criteria is satisfied. The clustering algorithm used for each partitioning step may be based on hypergraph, unstructured mesh partitioning and sparce matrix ordering (HMETIS) which is described in Karypis et al., "Multilevel Hypergraph Partitioning: Applications in VLSI Domain," 34th Design Automation Conference (1997). Other clustering algorithms may be used as well. The result is a hierarchy of concept clusters.

To create a three-dimensional concept navigation model from the cluster hierarchy, concepts that are sufficiently distinct to represent the meaning of the cluster need to be selected. In one implementation, the concepts having a high correlation with other concepts in the cluster, but with a relatively modest or low correlation with concepts in other clusters, are selected as concept representatives. The correlations may be determined by the edge weights in the original hypergraph.

In general, it may not be feasible to display at the same time all the clusters obtained from the hierarchical partitioning algorithm on the user's computer screen. To eliminate some of the intermediate clusters, snapshots of the cluster hierarchy may be stored during the hierarchical partitioning process so that the final concept navigation model contains a reduced number of clusters. A system administrator or knowledge administrator, for example, may determine when to take the snapshots by specifying the number of clusters desired for each cluster level in the final cluster hierarchy.

Each horizontal layer of concepts in FIG. 2 may be considered a cut of the tree with nodes whose depths in the tree are the same. Horizontal navigation may include movement among nodes of a horizontal layer. Similarly, vertical navigation may include movement from one snapshot of the tree to another.

The resulting hierarchical structure of concepts (including concept clusters) incorporates the relationship between concepts at the same level and concepts at different levels. Each concept may be linked to multiple documents. In addition, the resulting structure may indicate a relative strength for each link.

As further illustrated in FIG. 1, a mapping 32 stores information indicating what documents belong to a particular cluster and what document concepts are associated with a particular cluster. A list of the concepts, as well as a definition and summary of each concept, along with the concepts associated with each concept, may be stored as part of the hierarchical model 30. The system 20 also includes a search engine 36 and a search refinement and navigation tool 34.

The search refinement and navigation tool 34 is coupled to the user interface 24 to assist the call center agent 22 or other user in refining a search query and exploring possible solutions by navigating among concepts in the hierarchical concept model. The search refinement and navigation tool 34 includes various components including a concept navigator 42, which serves as a controller to determine which concepts should be displayed in response to the user's query or other input. Other components of the search refinement and navigation tool 34 are discussed below.

Figure 4:
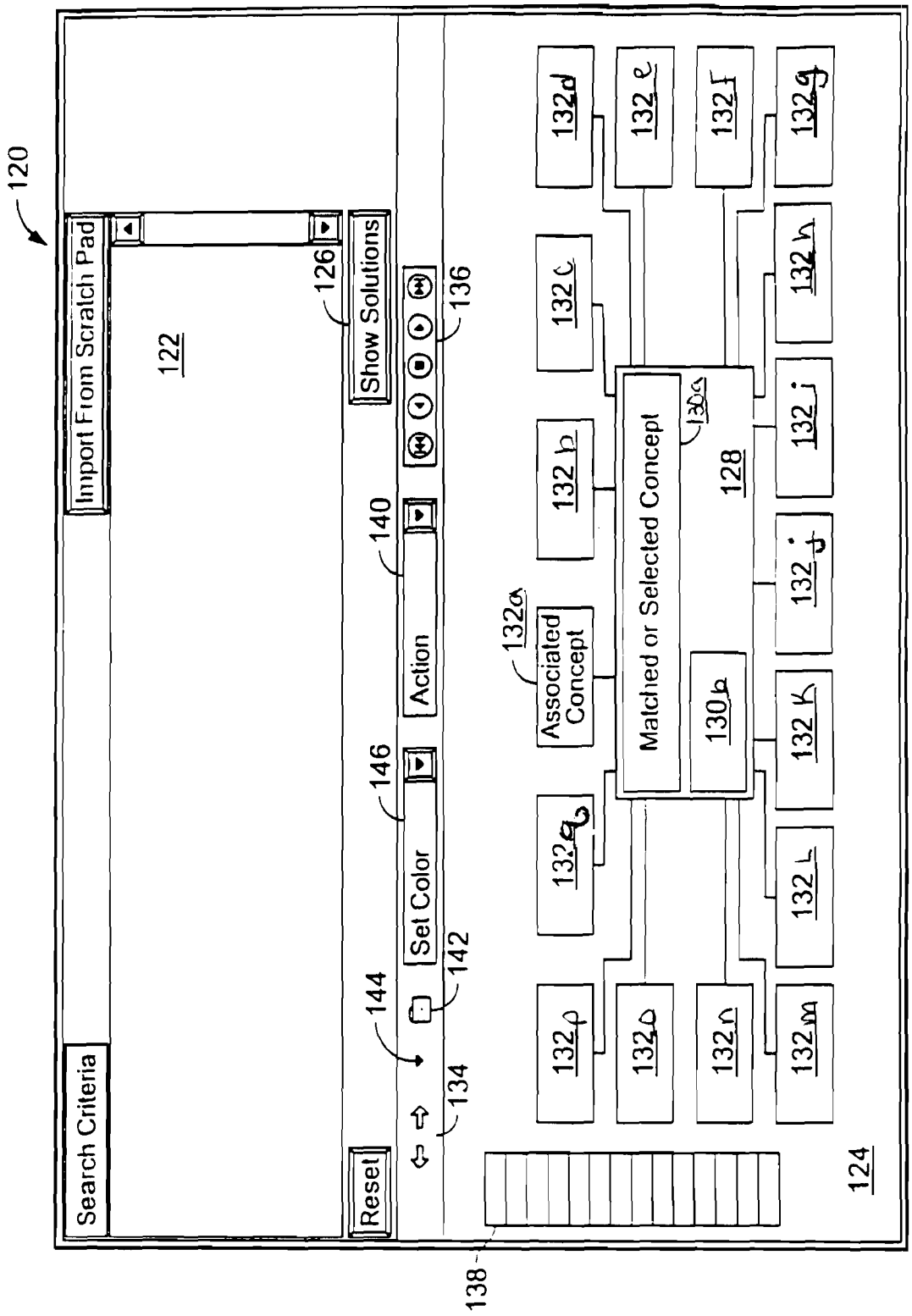
FIG. 4 illustrates an example of a screen display that provides a user interface for the system.

FIG. 4 illustrates an example of a portion of a display screen 120 that may serve as part of the user interface 24 in FIG. 1. The screen 120 includes a first area 122 in which the user may enter a search query and a second area 124 which allows the user to navigate a graphical display of the hierarchical model of concepts and which can be used to refine the search query.

During operation, a user may enter a search query in the first area 122 and may select a button 126 labeled "show solutions." The query may be entered in the area 122, for example, using a keyboard or other input device. The button 126 may be selected, for example using an electronic mouse or other input device. In response, the system passes the search query to the search engine 36 (FIG. 1), which identifies the concepts that match the query. A concept retriever component 40 of the search refinement and navigation tool 34 retrieves information about the matched concepts from the hierarchical model 30. The retrieved information may include a definition and summary for each matched concept as well as a list of the associated concepts and their relevant strengths of association to the matched concepts.

A graphical display of concepts that match the query as well as concepts that are associated with the matched concepts is provided in the second area 124 of the screen. The graphical display of matched concepts 130*a* and 130*b* and associated concepts 132*a*, 132*b*, . . . 132*q* may be presented, for example, in the formation of a wheel with the matched concept(s) appearing at the center or hub of the wheel, represented by a box 128. Hereafter, reference in this specification to concepts 130 refers to all of concepts 130*a* and 130*b*, and reference to concepts 132 refers to all of concepts 132*a*, 132*b*, . . . 132*q*. The associated concept(s) surround the box 128 and may be connected to the center box by radial lines or spokes. Each of the associated concepts 132 may be related to one or more of the matched concepts 130.

The concept navigator 42 (FIG. 1) manages the display of concepts on the user's screen. For situations in which the retrieved associated concepts 132 are too numerous for all of them to be displayed at the same time, the associated concepts having the highest relevant strengths initially may be displayed. Other ones of the associated concepts may be displayed in response to a rotation operation described below.

A list of documents or links to documents that match the query and that mention one or more of the concepts appearing in the box 128 may be provided on another area of the screen (not shown). The concepts 130 appearing in the box 128 may be referred to as "selected" concepts.

As mentioned above, the graphical display in the second area 124 of the screen may be used by the user to navigate the hierarchical concept model and, if desired, to refine the search query.

The user may obtain a brief description of a particular concept (including a concept cluster) by positioning a cursor over the displayed concept for at least a predetermined duration, for example, 0.8 seconds. By positioning the cursor over the displayed concept, a brief description of the concept appears on the screen until the user moves the cursor to another position. A summary viewer component 44 in the search refinement and navigation tool 34 (FIG. 1) controls the display of the concept and cluster descriptions. A timer 46 is provided for determining how long the cursor has been positioned over a particular concept.

The search refinement and navigation tool 34 also allows the user to view which selected concept 130 is associated with a particular one of the associated concepts 132. If there is only one concept in the box 128, that feature need not be activated because all the associated concepts 132 appearing on the screen are associated with the one selected concept. However, if there are multiple selected concepts in the box 128, the user may wish to know with which selected concept(s) 130 a particular concept 132 is associated and vice-versa. To use that feature, the user may position the cursor over a particular concept. The link(s) between the particular concept and the related concepts will appear highlighted if there exists a relatively strong association between them. The strength of relevancy may be represented, for example, by the color transition of the links.

The search refinement and navigation tool 34 allows a user to navigate from one concept to another, from one concept cluster to another cluster, and from one layer of concept details to another layer of concept details. For example, by moving the cursor over a particular one of the associated concepts displayed on the screen 120 and left or right-clicking the electronic mouse once, the system will display a different part of the hierarchical concept model with the selected concept appearing in the box 128 and surrounded by its associated concepts. A search query composer 48 in the search refinement and navigation tool 34 automatically composes a new search query based on the concept selected by the user. Documents in which the newly selected concept appears may be listed on another area of the screen (not shown). Arrows 134 may be used to move backward and forward among views in which different sets of concepts or concept clusters appear in the center box 128.

Various features allow the user to refine a search by adding or deleting concepts (or concept clusters) from the search query. A controller 50 (FIG. 1) in the search refinement and navigation tool may be used to manage those tasks. First, the user can add one or more associated concepts to the box 128 so that they will be considered selected concepts. That can be done, for example, by moving the cursor over a desired concept and dragging it to the box 128 using the electronic mouse. Similarly, to delete a concept from the box 128, the user may move the cursor over the particular concept and drag it outside the box using the mouse. Documents referring to one or more of the selected concepts in the box 128 may be listed elsewhere on the screen for review by the user. As previously mentioned, a particular concept cluster includes all the concepts or clusters within the particular cluster.

The user may retain one or more previously selected concepts in a refined search query while navigating from one view to another. To retain a concept temporarily as a selected concept, the user may, for example, move the cursor over a selected concept in the box 128 and double-click the electronic mouse. The double-clicked concept(s) may appear on the screen in a different color or be identified in some other visual way. If the user subsequently moves the cursor to an associated concept outside the center box 128 and clicks the electronic mouse, the previously double-clicked concepts will appear in the center box along with the newly selected concept. As before, documents containing one or more of the concepts in the box 128 may be listed elsewhere on the screen for review by the user. By double-clicking on a concept that previously was retained as a selected concept, that concept no longer will be retained as a selected concept if the user moves to another view of the hierarchical concept model. The foregoing features also may be managed by the controller 50 (FIG. 1) and can be used to refine a search query by selectively merging concepts from different views of the hierarchical concept model 30.

The number of associated concepts 132 will increase as more and more concepts are selected by the user and placed in the center box 128. However, in general, only a limited number of associated concepts can be displayed on the user's screen 120 at any given time. The search refinement and navigation tool 34 may provide a rotation feature that allows the user to navigate a particular selected concept horizontally through the navigation model 30 (FIG. 1). A rotation controller 52 manages the rotation feature and allows the user to rotate through the associated concepts if they are not all displayed on the screen 120. Rotation can be clockwise or counter-clockwise depending on the user's selection. In some implementations, the user may be able to select the speed of rotation from among two or more speeds. The user may pause the rotation at any time, and the direction of rotation direction can be reversed by the user.

To use the rotation feature, the user may click on an appropriate button in a rotation panel 136 to select one of the following actions: fast backward, backward, pause, forward, and fast forward. For example, if the user presses the backward button or fast backward button, the wheel will start to rotate in the counter-clockwise direction to allow the user to view associated concepts with less relevancy to the selected concept. Similarly, if the forward button or fast forward button is pressed, the wheel will start to rotate in the clockwise direction to allow the user to view more relevant concepts. If the user presses the pause button, rotation of the wheel will stop. In addition, rotation will stop when the end or beginning of the associated concept list is reached. The first and last concept in each list may be labeled for easy identification by the user.

The controller 52 also manages a zooming feature that allows the user to navigate vertically through different layers of the navigation concept model 30 with respect to a particular concept. Thus, the user can navigate to finer or coarser levels of granularity with respect to a selected concept. The zooming feature may include both zoom-in and zoom-out operations. In some implementations, the zooming operation may be used only for selected concepts, in other words, concepts appearing in the box 128. When the zooming feature is applied to a selected concept, the associated concepts are retrieved and displayed at the same layer as the selected concept.

In one implementation, the available zoom levels 138 appear in the upper-left portion of the screen area 124. Zooming in provides the user with a more detailed view of a concept cluster. Assuming the original concept cluster contains multiple concepts or concept clusters, the center of the original concept cluster will appear as the concept in the center box 128. Associated concepts are displayed at the spokes of the wheel based on the newly selected concept. Similarly, zooming out provides the user with a coarser level of detail of a concept cluster. The center of the parent cluster will be selected as the newly selected concept. The user may select a particular level of granularity by positioning the cursor over the desired zoom level 138 and clicking the mouse.

As shown in FIG. 1, the search refinement and navigation tool 34 also includes a view navigator component 54 that allows the user to navigate back and forth among historical changes to the displayed views of the hierarchical concept model 30. The view navigator 54 keeps track of different views that can be recalled upon the user's request. For example, as the user adds or deletes concepts from the center box 128 or navigates from one view to another, the previous set of selected concepts in the box are recorded and stored in a historical views database 56. In addition to backward and forward navigation among historical views using the arrows 134 (FIG. 4), the system can display a list of previous views from which the user may select a particular view. The system then displays the view selected by the user. If desired, the user can clear the navigation history so that all views other than the current view of the navigation concept model are cleared from the historical views database 56. The foregoing features may be accessed using the arrow 144 (FIG. 4).

Other actions, which are designed to enable a user to conduct advanced search query refinement processes based on complex Boolean operations, may be selected from a drop-down menu 140. Examples of such operations include Boolean operations for multiple views and Boolean operations for multiple selected concepts.

The multi-view merger operation allows the user to conduct advanced Boolean operations across the stored historical views 56 (FIG. 1). In particular, the user can conduct AND, OR and NOT operations to merge selected views and obtain the results to a modified search query automatically. Similarly, the multi-concept merger operation allows the user to conduct advanced Boolean operations across previously selected concepts. Thus, the user can conduct AND, OR and NOT operations to merge selected concepts and obtain the results of a modified search query automatically.

Figure 5:
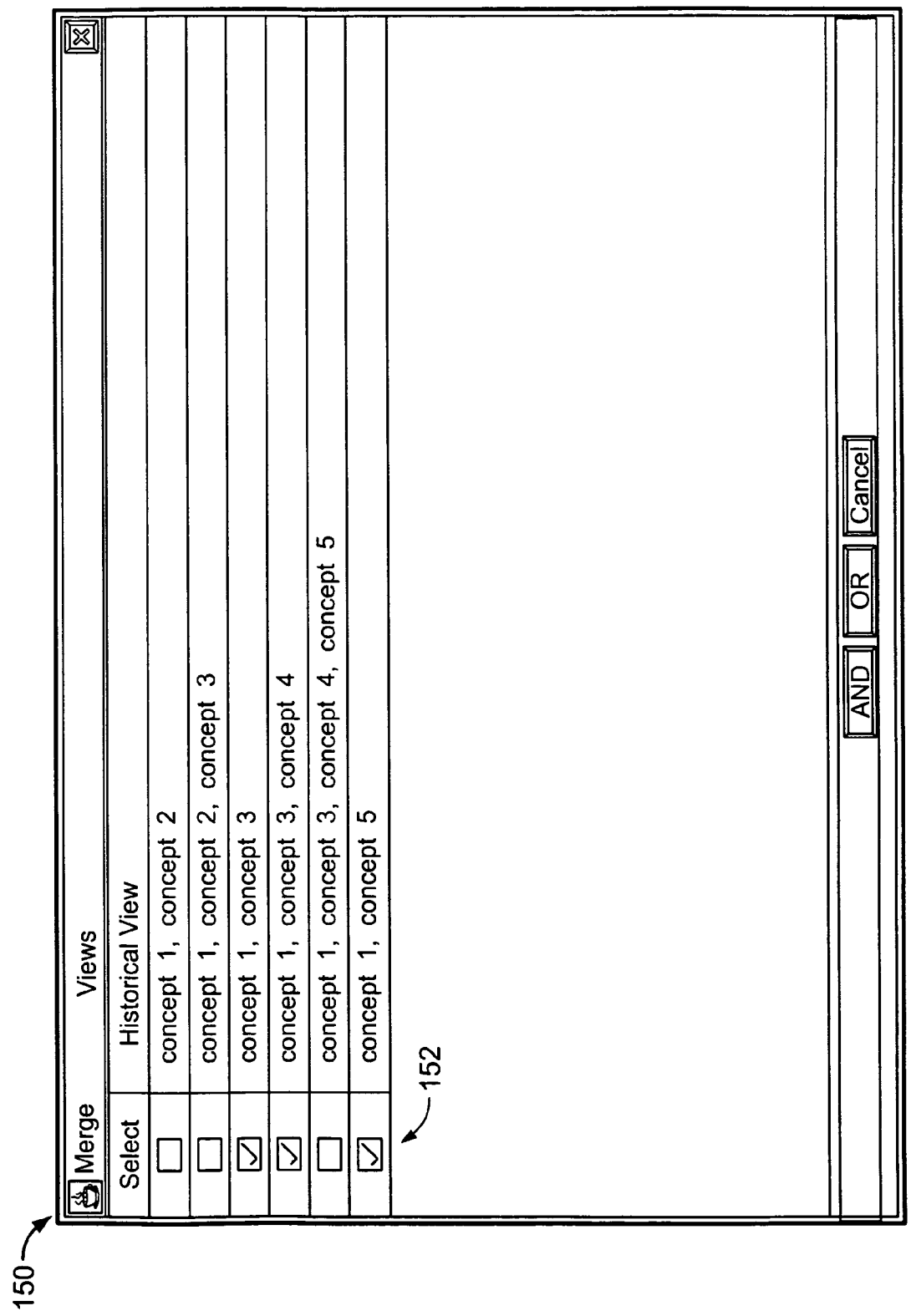
FIG. 5 illustrates an example of a pop-up dialog box for merging multiple views of the hierarchical concept model.

If the user selects the action for merging multiple views of the hierarchical concept model, a pop-up dialog box 150 (see FIG. 5) may be displayed to show all the recorded views. Check-boxes 152 may be checked or marked so as to include or exclude the corresponding views in the modified search query. A similar pop-up dialog box with check-boxes would appear if the user selects an action for merging multiple previously-selected concepts. In either case, once the user completes the request for the particular action, the system automatically executes a new search query based on the merged views or concepts and displays the results as discussed above. A multi-view merger component 62 and a multi-concept merger component 64 in the search refinement and navigation tool (FIG. 1) manage the foregoing tasks, respectively.

The search refinement and navigation tool 34 may allow the user to perform various bookmark operations, which may provide an efficient way to recall an important view of the concept model or to provide guidance to an inexperienced user. Examples of bookmark operations include adding a bookmark, adding a bookmark folder, deleting a bookmark or bookmark folder, using a previously created bookmark and using another person's bookmark. The bookmark operations can be performed by making an appropriate selection from a drop-down action menu by pressing the icon 142 (FIG. 4). A bookmark editor 58 in the search refinement and navigation tool 34 (FIG. 1) manages the creation, deletion and storage of bookmarks and bookmark folders. The bookmarks may be stored, for example, in a tree-structure. A bookmark retriever component 60 manages the retrieval and updating of bookmarks.

A preference editor 66 (FIG. 1) can provide and manage a set of options that an individual user can set and change to reflect personal preferences to enhance visualization effects and improve the efficiency of the refinement process. For example, drop-down menu 146 (FIG. 4) may be used to change the color(s) of the display on the user's computer screen. Personal preference profiles, which store information about the preferences of individual users, may be stored in a database 68 (FIG. 1).

Figure 6:
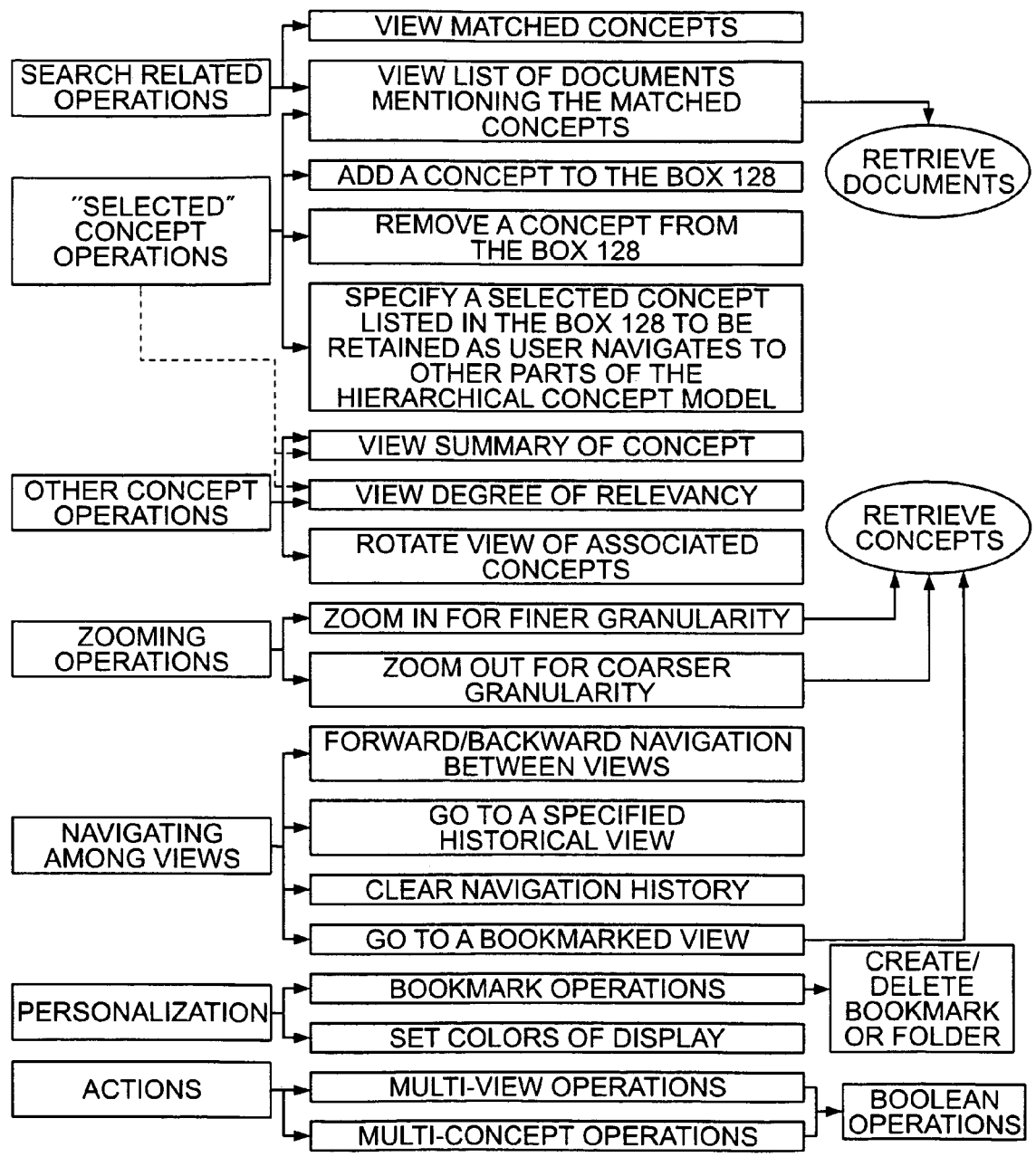
FIG. 6 is a chart listing examples of user operations.

A chart listing various user operations, some or all of which may be included in various implementations, is shown in FIG. 6. Other features may be present in some implementations to allow the user to navigate the hierarchical concept model and to refine a search query in other ways based on the graphical display of the hierarchical concept model.

Based on the hierarchical concept model discussed above, a user can use either horizontal navigation, vertical navigation or both to refine a search query. The navigation behavior may include the following categories: (1) navigation based on relevancy, (2) navigation based on searching, and (3) navigation based on Boolean operations.

In navigations based on relevancy, the user may look for additional concepts from among the displayed associated concepts to refine the search query using the drag and drop approach to add or remove concepts from the center box 128 (FIG. 4). Such an approach allows the user to navigate horizontally among the concepts. In navigations based on searching, the user may utilize the text search query to locate initial matching concepts. The search refinement process may include a combination of the text search query and retaining one or more of the selected concepts as the user navigates horizontally or vertically through the concept model. In navigations based on Boolean operations, the user may apply Boolean operations to merge either previous views or to merge previously selected concepts to refine the search query. The user may employ any or all of the foregoing types of navigation behavior as part of a particular search.

Although a hub and spoke display format is described above for displaying the matched and associated concepts on the user's computer screen, other display formats may be used as well. More generally, the selected concepts may be listed in a first section of the display area, and the associated concepts may be listed elsewhere in that area. In a particular, alternative implementation, the selected and associated concepts may be displayed in a hierarchical tree structure, with the selected concepts identified by particular nodes in the tree structure.

Various implementations of the foregoing systems and techniques can be realized in digital electronic circuitry, integrated circuitry, specially designed ASICs (application specific integrated circuits), computer hardware, firmware, software or combinations of them. The implementations may include one or more computer programs that are executable or interpretable on a programmable system including at least one programmable processor, which may be special or general purpose, coupled to receive data and instructions from, and to transmit data and instructions to, a storage system, at least one input device, and at least one output device.

The computer programs (also known as programs, software, software applications or code) may include machine instructions for a programmable processor, and may be implemented in a high-level procedural or object-oriented programming language, or in assembly/machine language. As used herein, the term "machine-readable medium" refers to any computer program product, apparatus or device (e.g., magnetic discs, optical disks, memory, Programmable Logic Devices (PLDs)) used to provide machine instructions or data to a programmable processor, including a machine-readable medium that receives machine instructions as a machine-readable signal. The term "machine-readable signal" refers to any signal used to provide machine instructions or data to a programmable processor.

To provide for interaction with a user, the systems and techniques described here may include a computer having a display device (e.g., a CRT (cathode ray tube) or LCD (liquid crystal display) monitor for displaying information to the user and a keyboard and a pointing device (e.g., a mouse or a trackball) by which the user can provide input to the computer. Other kinds of devices can be used to provide for interaction with a user as well. Input from the user may be received in various forms, including acoustic, speech, or tactile input.

One application for the system 20 is in the context of customer relationships management. For example, customers may contact a call center agent with a request for information or a question regarding a product or service. If the call center agent does not know the answer, the system 20 allows the call center agent to enter a search query that can be refined easily by navigating through the navigation concept model 30 using the graphical display in the second area 124 of the screen. The system can, therefore, facilitate the call center agent's locating the proper solution so that the information can be delivered to the customer quickly and efficiently. The system 20 also can be used as a learning tool to improve a call center agent's understanding of the knowledge base 26 and its contents.

Although the system may be particularly advantageous in the context of customer relationships management, it may be used in others contexts as well.

Other implementations are within the scope of the claims.

What is claimed is:

1. A computer-implemented method comprising:
   providing a search input visual display on a display device, the search input visual display comprising a search query area and a concept navigation area that is separate from the search query area, the concept navigation area comprising a first section and a second section separate from the first section;
   receiving a search query that is entered by a user and displayed within the search query area;

performing a first search to identify any documents stored in a knowledge base that match the search query;

identifying any predefined concepts, from a predefined model of concepts, that are mentioned in at least one of any documents identified in the first search, wherein each of the predefined concepts from the model is a term or a phrase, and wherein the predefined model defines associations between different ones of the predefined concepts;

displaying, in the first section of the concept navigation area, any of the predefined concepts that were identified as being mentioned in any documents identified in the first search;

displaying, in the second section of the concept navigation area, any predefined concepts that the predefined model defines to be associated with at least one of any predefined concepts displayed in the first section of the concept navigation area;

receiving a user selection of one of the associated concepts displayed in the second section of the concept navigation area;

performing a second search to identify any documents stored in the knowledge base that match the search query and that mention the selected associated concept; and displaying, in a search results display area, a list of any documents identified in the second search.

2. The method of claim 1 including:
displaying the one or more concepts that match the search query in a center area; and
displaying the associated concepts at distal ends of spokes connected to the center area.

3. The method of claim 1 including:
adding one or more of the associated concept to the first section of the display in response to user input; and
displaying a list of one or more documents or links to documents each of which mentions at least one of the concepts in the first section of the display.

4. The method of claim 3 including adding an associated concept to the first section of the display in response to the user's dragging and dropping that associated concept into the first section using a user input device.

5. The method of claim 1 including:
removing a concept from the first section of the display in response to user input; and
displaying a list of one or more documents or links to documents each of which mentions at least one concept in the first section of the display.

6. The method of claim 5 including removing a concept from the first section of the display in response to the user's dragging and dropping that concept out of the first section using a user input device.

7. The method of claim 1 including displaying an indication of a degree of association between each associated concept and at least one concept listed in the first section of the display.

8. The method of claim 1 including identifying which associated concepts are associated with each concept listed in the first section of the display.

9. The method of claim 1 including:
displaying a different view of the hierarchical model of concepts in response to user input specifying one of the displayed associated concepts, wherein, in the different view, only the specified concept appears in the first section of the display; and providing a list of one or more documents or links to documents each of which mentions the specified concept appearing in the first section of the display.

10. The method of claim 1 including:
displaying a different view of the hierarchical model of concepts in response to user input specifying one of the displayed associated concepts, wherein, in the different view, the specified concept appears in the first section of the display along with one or more concepts previously specified by the user to be retained in future views of the hierarchical concept model; and
displaying a list of one or more documents or links to documents each of which mentions at least one of the concepts in the first section of the display.

11. The method of claim 1 including displaying a different view of the hierarchical model of concepts in response to user input, wherein, in the different view, a different level of granularity is displayed for a concept specified by the user.

12. The method of claim 11 including displaying a finer level of granularity of detail for the specified concept.

13. The method of claim 11 including displaying a coarser level of granularity of detail for the specified concept.

14. The method of claim 1 including displaying a description of a particular displayed concept in response to user input specifying the particular displayed concept.

15. The method of claim 1 including displaying, in response to user input, additional concepts that are associated with the concepts listed in the first section of the display.

16. The method of claim 1 including providing, in response to user input, a list of historical views of the hierarchical concept model previously displayed.

17. The method of claim 16 including displaying a new view of the hierarchical concept model that combines a plurality of historical views specified by the user, wherein, in the new view, concepts previously listed in the first section of the display for at least one of the specified historical views are listed in the first section of the display, and associated concepts are listed elsewhere in the display.

18. The method of claim 16 including displaying one of the historical views specified by the user.

19. The method of claim 1 including displaying, in response to user input, a view of the hierarchical concept model previously displayed to the user.

20. The method of claim 1 including:
providing, in response to user input, a list of concepts previously listed in the first section of the display for different views of the hierarchical concept model; and
displaying a new view of the hierarchical concept model based on a combination of concepts specified by the user from the list of concepts previously listed in the first section, wherein, in the new view, the specified concepts are listed in the first section of the display, and concepts that are associated with the specified concepts are listed elsewhere in the display.

21. The method of claim 1 including displaying a list of one or more documents or links to documents each of which mentions at least one of the concepts in the first section of the display.

22. An article comprising a machine-readable medium that stores machine-executable instructions that when applied to the machine, cause the machine to:
provide a search input visual display on a display device, the search input visual display comprising a search query area and a concept navigation area that is separate from the search query area, the concept navigation area comprising a first section and a second section separate from the first section;

receive a search query that is entered by a user and displayed within the search query area;

perform a first search to identify any documents stored in a knowledge base that match the search query;

identify any predefined concepts, from a predefined model of concepts, that are mentioned in at least one of any documents identified in the first search, wherein each of the predefined concepts from the model is a term or a phrase, and wherein the predefined model defines associations between different ones of the predefined concepts;

display, in the first section of the concept navigation area, any of the predefined concepts that were identified as being mentioned in any documents identified in the first search;

display, in the second section of the concept navigation area, any predefined concepts that the predefined model defines to be associated with at least one of any predefined concepts displayed in the first section of the concept navigation area;

receive a user selection of one of the associated concepts displayed in the second section of the concept navigation area;

perform a second search to identify any documents stored in the knowledge base that match the search query and that mention the selected associated concept; and display, in a search results display area, a list of any documents identified in the second search.

23. The article of claim 22 including machine-executable instructions that, when applied to the machine, cause the machine to:
display the one or more concepts that match the search query in a center area; and
display the associated concepts at distal ends of spokes connected to the center area.

24. The article of claim 22 including machine-executable instructions that, when applied to the machine, cause the machine to:
add an associated concept to the first section of the display in response to user input; and
display a list of one or more documents or links to documents each of which mentions at least one concept in the first section of the display.

25. The article of claim 22 including machine-executable instructions that, when applied to the machine, cause the machine to add an associated concept to the first section of the display in response to the user's dragging and dropping that associated concept into the first section using a user input device.

26. The article of claim 22 including machine-executable instructions that, when applied to the machine, cause the machine to:
remove a concept from the first section of the display in response to user input; and
display a list of one or more documents or links to documents each of which mentions at least one concept in the first section of the display.

27. The article of claim 26 including machine-executable instructions that, when applied to the machine, cause the machine to remove a concept from the first section of the display in response to the user's dragging and dropping that concept out of the first section using a user input device.

28. The article of claim 22 including machine-executable instructions that, when applied to the machine, cause the machine to display an indication of a degree of association between each associated concept and at least one concept listed in the first section of the display.

29. The article of claim 22 including machine-executable instructions that, when applied to the machine, cause the machine to identify which associated concepts are associated with each concept listed in the first section of the display.

30. The article of claim 22 including machine-executable instructions that, when applied to the machine, cause the machine to:
display a different view of the hierarchical model of concepts in response to user input specifying one of the displayed associated concepts, wherein, in the different view, only the specified concept appears in the first section of the display; and
provide a list of one or more documents or links to documents each of which mentions the specified concept in the first section of the display.

31. The article of claim 22 including machine-executable instructions that, when applied to the machine, cause the machine to:
display a different view of the hierarchical model of concepts in response to user input specifying one of the displayed associated concepts, wherein, in the different view, the specified concept appears in the first section of the display along with one or more concepts previously specified by the user to be retained in future views of the hierarchical concept model; and
display a list of one or more documents or links to documents each of which mentions at least one of the concepts in the first section of the display.

32. The article of claim 22 including machine-executable instructions that, when applied to the machine, cause the machine to display a different view of the hierarchical model of concepts in response to user input, wherein, in the different view, a different level of granularity is displayed for a concept specified by the user.

33. The article of claim 32 including machine-executable instructions that, when applied to the machine, cause the machine to display a finer level of granularity of detail for the specified concept.

34. The article of claim 32 including machine-executable instructions that, when applied to the machine, cause the machine to display a coarser level of granularity of detail for the specified concept.

35. The article of claim 22 including machine-executable instructions that, when applied to the machine, cause the machine to display a description of a particular displayed concept in response to user input specifying the particular displayed concept.

36. The article of claim 22 including machine-executable instructions that, when applied to the machine, cause the machine to display, in response to user input, additional concepts associated with the concepts in the first section of the display.

37. The article of claim 22 including machine-executable instructions that, when applied to the machine, cause the machine to provide, in response to user input, a list of historical views of the hierarchical concept model previously displayed.

38. The article of claim 37 including machine-executable instructions that, when applied to the machine, cause the machine to display a new view of the hierarchical concept model that combines a plurality of historical views specified by the user, wherein, in the new view, concepts previously listed in the first section of the display for at least one of the specified historical views are listed in the first section of the display, and associated concepts are listed elsewhere in the display.

39. The article of claim 37 including machine-executable instructions that, when applied to the machine, cause the machine to display one of the historical views specified by the user.

40. The article of claim 22 including machine-executable instructions that, when applied to the machine, cause the machine to display, in response to user input, a view of the hierarchical concept model previously displayed to the user.

41. The article of claim 22 including machine-executable instructions that, when applied to the machine, cause the machine to:
provide, in response to user input, a list of concepts previously listed in the first section of the display for different views of the hierarchical concept model; and
display a new view of the hierarchical concept model based on a combination of concepts specified by the user from the list of concepts previously listed in the first section, wherein, in the new view, the specified concepts are listed in the first section of the display, and concepts that arc associated with the specified concepts are listed elsewhere in the display.

42. The article of claim 22 including machine-executable instructions that, when applied to the machine, cause the machine to display a list of one or more documents or links to documents each of which mentions at least one of the concepts in the first section of the display.

43. A system comprising:
a knowledge base storing documents;
memory storing a model of concepts each of which appears in at least one document stored in the knowledge base and is a term or phrase;
a display screen including a concept navigation area with a first section;
a user input device; and
circuitry coupled to the knowledge base, the memory, the display screen and the user input device to:
provide a search input visual display on a display device, the search input visual display comprising a search query area and a concept navigation area that is separate from the search query area, the concept navigation area comprising a first section and a second section separate from the first section;
receive a search query that is entered by a user and displayed within the search query area;
perform a first search to identify any documents stored in a knowledge base that match the search query;
identify any predefined concepts, from a predefined model of concepts, that are mentioned in at least one of any documents identified in the first search, wherein each of the predefined concepts from the model is a term or a phrase, and wherein the predefined model defines associations between different ones of the predefined concepts;
cause the display screen to display, in the first section of the concept navigation area, any of the predefined concepts that were identified as being mentioned in any documents identified in the first search;
cause the display screen to display, in the second section of the concept navigation area, any predefined concepts that the predefined model defines to be associated with at least one of any predefined concepts displayed in the first section of the concept navigation area;
receive a user selection of one of the associated concepts displayed in the second section of the concept navigation area;
perform a second search to identify any documents stored in the knowledge base that match the search query and that mention the selected associated concept; and
display, in a search results display area, a list of any documents identified in the second search.

44. The system of claim 43 including circuitry to:
cause the display screen to display the one or more concepts that match the search query in a center area; and
cause the display screen to display the associated concepts at distal ends of spokes connected to the center area.

45. The system of claim 43 including circuitry to:
add an associated concept to the first section of the display in response to user input; and
cause the display screen to display a list of one or more documents or links to documents each of which mentions at least one concept in the first section of the display screen.

46. The system of claim 45 including circuitry to add an associated concept to the first section of the display in response to the user's dragging and dropping that associated concept into the first section using the user input device.

47. The system of claim 45 including circuitry to cause the display screen to display a degree of association between an associated concept and a concept listed in the first section of the display in response to user input.

48. The system of claim 45 including circuitry to:
cause the display screen to display a different view of the hierarchical model of concepts in response to user input specifying one of the displayed associated concepts, wherein, in the different view, only the specified concept appears in the first section of the display; and
cause the display screen to display a list of one or more documents or links to documents each of which mentions the specified concept appearing in the first section of the display screen.

49. The system of claim 43 including circuitry to:
remove a concept from the first section of the display in response to user input; and
cause the display screen to display a list of one or more documents or links to documents each of which mentions at least one concept in the first section of the display screen.

50. The system of claim 49 including circuitry to remove a concept from the first section of the display in response to the user's dragging and dropping that concept out of the first section of the display screen using the user input device.

51. The system of claim 43 including circuitry to cause the display screen to display an identification of which associated concepts are associated with each concept listed in the first section of the display screen.

52. The system of claim 43 including circuitry to:
cause the display screen to display a different view of the hierarchical model of concepts in response to user input specifying one of the displayed associated concepts, wherein, in the different view, the specified concept appears in the first section of the display along with one or more concepts previously specified by the user to be retained in future views of the hierarchical concept model; and cause the display screen to display a list of one or more documents or links to documents each of which mentions at least one of the concepts in the first section of the display screen.

53. The system of claim 43 including circuitry to cause the display screen to display a different view of the hierarchical model of concepts in response to user input, wherein, in the different view, a different level of granularity is displayed for a concept specified by the user.

54. The system of claim 53 including circuitry to cause the display screen to display a finer level of granularity of detail for the specified concept in response to user input.

55. The system of claim 53 including circuitry to cause the display screen to display a coarser level of granularity of detail for the specified concept in response to user input.

56. The system of claim 43 including circuitry to cause the display screen to display a description of a particular displayed concept in response to user input specifying the particular displayed concept.

57. The system of claim 43 including circuitry to cause the display screen to display, in response to user input, additional concepts associated with the concepts listed in the first section of the display screen.

58. The system of claim 43 including circuitry to cause the display screen to display, in response to user input, a list of historical views of the hierarchical concept model previously displayed.

59. The system of claim 58 including circuitry to cause the display screen to display a new view of the hierarchical concept model that combines a plurality of historical views specified by the user, wherein, in the new view, concepts previously listed in the first section of the display screen for at least one of the specified historical views are listed in the first section of the display screen, and associated concepts are listed elsewhere in the display screen.

60. The system of claim 58 including circuitry to cause the display screen to display one of the historical views specified by the user.

61. The system of claim 43 including circuitry to cause the display screen to display, in response to user input, a view of the hierarchical concept model previously displayed to the user.

62. The system of claim 43 including circuitry to:
cause the display screen to display, in response to user input, a list of concepts previously listed in the first section of the display for different views of the hierarchical concept model; and
cause the display screen to display a new view of the hierarchical concept model based on a combination of concepts specified by the user from the list of concepts previously listed in the first section, wherein, in the new view, the specified concepts are listed in the first section of the display, and concepts that are associated with the specified concepts are listed elsewhere in the display.

63. The system of claim 43 including circuitry to display a list of one or more documents or links to documents each of which mentions at least one of the concepts in the first section of the display screen.

64. A computer-implemented method comprising:
identifying concepts that are mentioned in electronic documents stored in a knowledge base, each of the concepts being a term or phrase;
generating a matrix to reflect co-occurrence frequencies of concepts appearing in the electronic documents;
generating association rules based on the co-occurrence frequencies, wherein the association rules are indicative of frequencies with which specified groups of concepts appear in the same electronic document;
converting the association rules to an undirected hypergraph;
partitioning the undirected hypergraph into clusters of concepts, wherein each cluster is represented by one or more characteristic concepts in that cluster;
taking snapshots of the hypergraph during the partitioning; and
storing a three-dimensional hierarchical model of the concepts based on the snapshots.

65. The method of claim 64 including, for each cluster, selecting one or more characteristic concepts having a high correlation with other concepts in the same cluster as representatives of that cluster.

66. The method of claim 65 including determining the correlation based on an edge weight of the hypergraph.

67. The method of claim 65 storing relationships between concepts at the same level and different levels of the hierarchical concept model.

68. The method of claim 67 including storing strengths of links between different concepts.

69. An article comprising a machine-readable medium that stores machine-executable instructions that when applied to the machine, cause the machine to:
identify concepts that are mentioned in documents stored in a knowledge base, each of the concepts being a term or phrase;
generate a matrix to reflect co-occurrence frequencies of concepts appearing in the documents;
generate association rules based on the co-occurrence frequencies, wherein the association rules are indicative of frequencies with which specified groups of concepts appear in the same document;
convert the association rules to an undirected hypergraph;
partition the undirected hypergraph into clusters of concepts, wherein each cluster is represented by a concept in that cluster;
take snapshots of the clusters during the partitioning; and
store a three-dimensional hierarchical model of the concepts based on the snapshots.

70. The article of claim 69 including machine-executable instructions that, when applied to the machine, cause the machine to select, for each cluster, one or more characteristic concepts having a high correlation with other concepts in the same cluster as representatives of that cluster.

71. The article of claim 70 including machine-executable instructions that, when applied to the machine, cause the machine to determine the correlation based on an edge weight of the hypergraph.

72. The article of claim 70 including machine-executable instructions that, when applied to the machine, cause the machine to store relationships between concepts at the same level and different levels of the hierarchical concept model.

73. The article of claim 72 including machine-executable instructions that, when applied to the machine, cause the machine to store strengths of links between different concepts.

* * * * *